United States Patent [19]

Hepp

[11] Patent Number: 4,687,802

[45] Date of Patent: Aug. 18, 1987

[54] GLASS FIBER REINFORCED POLYESTER MOLDING COMPOSITIONS CONTAINING METAL SALTS

[75] Inventor: Leonard R. Hepp, Evansville, Ind.

[73] Assignee: General Electric Company, Pittsfield, Mass.

[21] Appl. No.: 705,444

[22] Filed: Feb. 25, 1985

[51] Int. Cl.$^4$ .................... C08L 67/02; C08K 3/10; C08K 3/22; C08K 3/26

[52] U.S. Cl. .................................. 524/411; 524/405; 524/414; 524/417; 524/418; 524/420; 524/423; 524/429; 524/430; 524/431; 524/432; 524/433; 524/435; 524/436; 524/437; 524/401; 524/605; 524/413

[58] Field of Search ............... 524/605, 413, 411, 401, 524/405, 414, 417, 418, 423, 429, 430, 431, 432, 433, 435, 436, 437

[56] References Cited

U.S. PATENT DOCUMENTS

| | | | |
|---|---|---|---|
| 3,936,413 | 2/1976 | Wurmb et al. | 260/40 R |
| 3,937,757 | 2/1976 | Sedyl et al. | 260/873 |
| 3,947,421 | 3/1976 | Seydl | 524/605 |
| 4,000,109 | 12/1976 | Smith et al. | 260/40 R |
| 4,035,333 | 7/1977 | Kamada | 524/605 |
| 4,052,356 | 10/1977 | Breitenfellner | 524/605 |
| 4,104,242 | 8/1978 | Kochanowski et al. | 260/40 R |
| 4,363,899 | 12/1982 | Shirahata | 524/605 |
| 4,368,286 | 1/1983 | Hayashi | 524/605 |
| 4,421,888 | 12/1983 | Okada | 524/371 |
| 4,447,573 | 5/1984 | Horlbeck | 524/605 |
| 4,456,723 | 6/1984 | Breitenfellner | 524/605 |
| 4,510,196 | 4/1985 | Carter, Jr. | 428/220 |
| 4,521,560 | 6/1985 | Breitenfellner | 524/371 |

FOREIGN PATENT DOCUMENTS 2755910 7/1978 Fed. Rep. of Germany .
1538896 1/1979 United Kingdom .

OTHER PUBLICATIONS

Kirk–Othmer, Encyclopedia of Chemical Technology, 2nd ed; vol. 2, p. 735; Wiley–Interscience; N.Y. 1963.

*Primary Examiner*—C. Warren Ivy
*Attorney, Agent, or Firm*—Martin Barancik; Michael J. Doyle; William F. Mufatti

[57] ABSTRACT

Metal salts are disclosed as effective to reduce Arc Track Rate in poly(1,4-butylene terephthalate) resin molding compositions.

9 Claims, No Drawings

GLASS FIBER REINFORCED POLYESTER MOLDING COMPOSITIONS CONTAINING METAL SALTS

This invention relates to poly(1,4-butylene terephthalate) resin molding compositions with improved electrical properties. More particularly, this invention relates to poly(1,4-butylene terephthalate) resin molding compositions which contain metal salts effective to improve Arc Track Rate, and optionally, flame retardants.

BACKGROUND

Poly(1,4-butylene terephthalate) resin is widely used in molding compositions due to its many excellent properties, i.e., dimensional stability, strength, solvent resistance, etc. Of growing importance are applications which require that this resin also have good electrical properties. In such applications, the molded parts may be exposed to severe conditions, such as exposure to electrical discharge or to excessive leakage current across a surface. These conditions require not only that the molded part have flame resistance, but also that the molded part have a high degree of resistance to carbonization, i.e., good track resistance, and a high degree of resistance to electrical discharge, i.e., good arc resistance.

It has been a problem that poly(1,4-butylene terephthalate) resin generally has insufficient electrical properties. Polyester resin molding compositions with improved arc resistance are described, for example, in U.S. Pat. No. 4,052,356, issued Oct. 4, 1977, to Breitenfellner, et al., and assigned to Ciba Geigy A.G. This patent discloses reinforced polybutylene terephthalate compositions containing kaolin from which molded articles having an Arc Resistance of 80–125 sec., ASTM D-495, and a Comparative Tracking Index, ASTM 3638, of 250–275 volts can be obtained. U.S. Pat. No. 4,035,333, issued July 12, 1977 to Kamada, et al., and assigned to Mitsubishi Rayon Co. Ltd., discloses that polybutylene terephthalate molding compositions containing sodium antimonate or a sodium antimonate/antimony trioxide mixture together with talc provide molded articles having improved arc resistance. Japanese Published Patent Application No. 52-58752/1977 discloses flame resistant polyester molding compositions containing mineral fillers and fibrous glass to provide a resin with an improved arc resistance. It has been found that flame retardant polybutylene terephthalate resin compositions filled with approximately 30 to 60 percent by weight of fibrous glass and talc will provide articles molded therefrom with an Arc Resistance of at least 150 sec. and a Comparative Tracking Index of at least 400 volts.

Therefore, it is an object of the present invention to provide poly(1,4-butylene terephthalate) resin molding compositions having improved electrical properties.

It is a further object of the present invention to provide flame retarded poly(1,4-butylene terephthalate) resin molding compositions having improved electrical properties.

DESCRIPTION OF THE INVENTION

According to the present invention, there are provided poly(1,4-butylene terephthalate) resin molding compositions with improved Arc Track Rate comprising:

(a) thermoplastic poly(1,4-butylene terephthalate) resin; and (b) an Arc Track Rate reducing amount of at least one effective metal salt;

and optionally comprising:

(c) a reinforcing amount of filamentous glass reinforcement;

(d) an effective amount of halogenated aromatic flame retardant;

(e) an effective amount of antimony compound synergist;

(f) up to 80 weight parts of another thermoplastic resin per 20 weight parts poly(1,4-butylene terephthalate) resin;

(g) impact modifier; and (h) stabilizers.

The poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, and polyester-forming derivatives therefore.

The glycol component can contain not more than 30 mol %, preferably not more than 20 mol %, of another glycol, shuch as ethylene glycol, trimethylene glycol, 2-methyl-1,3-propane glycol, hexamethylene glycol, decamethylene glycol, cyclohexane dimethanol, or neopentylene glycol.

The acid component can contain not more than 30 mol %, preferably not more than 20 mol %, of another acid such as isophthalic acid, 2,6-naphthalenedicarboxylic acid, 2,7-naphthalenedicarboxylic acid, 1,5-naphthalenedicarboxylic acid, 4,4'-diphenyldicarboxylic acid, 4,4'-diphenoxyethandicarboxylic acid, p-hydroxy benzoic acid, sebacic acid, adipic acid and polyester-forming derivatives thereof.

The aromatic polyester resin used in this invention preferably has an intrinsic viscosity [n] (measured in 60/40 by weight phenol/tetrachloroethane at 30° C.) of 0.3 to 1.5 dl./g.

The compositions of this invention may further contain one or more reinforcing agents including glass fiber. Typical reinforcing agents useful for the invention include but are not limited to, glass fiber, talc, mica or combinations thereof.

The filamentous glass which may be employed as reinforcement in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda-free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch but this is not critical to the present invention.

The length of the glass filaments and whether or not they are bundled into fibers and the fibers bundled in turn to yarns, ropes or rovings, or woven into mats and the like are also not critical to the invention. However, in preparing the molding compositions it is convenient to use the filamentous glass in the form of chopped strands of from about ⅛" to about 2" long. In articles molded from the compositions on the other hand, even shorter lengths will be encountered because, during compounding considerable fragmentation will occur. This is desirable, however, because the best properties are exhibited by thermoplastic injection molded articles in which the filament lengths lie between about 0.000005" and 0.125 (⅛").

In general, best properties will be obtained if the filamentous glass reinforcement comprises from about 2.5 to about 90% by weight based on the combined weight of glass and resin, and preferably from about 5 to about 55% by weight. It is especially preferred that the glass comprise from about 20 to about 40% by weight based on the combined weight of glass and resin. Generally, for direct molding use, up to about 60% of glass can be present without causing flow problems. However, it is useful also to prepare the compositions containing substantially greater quantities, e.g., up to 80–90% by weight of glass. These concentrates can be custom blended with resins that are not glass reinforced to provide any desired glass content of a lower value.

Present in the molding compositions of the present invention are metal salts which are effective to reduce Arc Track Rate. Such effective metal salts may be easily identified by persons skilled in the art routinely performing analysis of compositions containing such. Herein, metal salts mean metal oxides and sulfides; metal fluorides, chlorides, bromides, and iodides; metal carbonates, chlorates, nitrates, nitrites, borates, phosphates, phosphites, sulfates, sulfites, etc.; and organic metal salts, such as metal benzoates, etc. Suitable metals for use herein include copper, zinc, magnesium, aluminum, iron, potassium, and the like, but especially preferred are copper, zinc and potassium. Specifically suitable for use herein are copper sulfide, potassium iodide, cuprous iodide, cuprous chloride, cupric chloride, zinc carbonate, and copper sulfide. Metal salts fitting the above description are readily available on the market. At least one effective metal salt must be added to the molding compositions in at least an Arc Track Rate reducing amount but preferably not in such excessive amount that other essential properties of the molding composition are degraded. Generally, from about 0.05 to about 10 parts by weight of at least one effective metal salt may be added for each 35 to 50 parts by weight resin and halogenated aromatic flame retardant but preferably from about 0.05 to about 1 parts by weight of the effective metal salt is added for each 50 parts by weight of such resin and halogenated aromatic flame retardant.

The amount of flame-retardant additive used is not critical to the invention, so long as it is at least sufficient to reduce the flammability of the polyester resin. Those skilled in the art are well aware that the amount will vary with the nature of the resin and with the efficiency of the additive. In general, however, the amount of additive will be from 0.5 to 50 parts by weight per 100 parts of resin. A preferred range will be from about 3 to 50 parts and an especially preferred range will be from about 8 to 45 parts of additive per 100 parts of resin. Synergists, e.g., antimony oxide, will be used at about 2 to 15 parts by weight per 100 parts of resin.

Any of the conventional halogenated aromatic flame-retardants, such as decabromodiphenyl ether can be employed in the composition of the present invention. Preferred flame-retardants are aromatic carbonate homopolymers having repeating units of the formula:

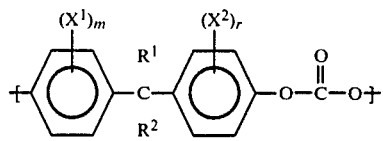

wherein $R^1$ and $R^2$ are hydrogen, (lower) alkyl or phenyl, $X^1$ and $X^2$ are bromo or chloro or mixtures thereof and m and r are from 1 to 4. It is escpecially preferred that $R^1$ and $R^2$ be methyl and that $X^1$ and $X^2$ be bromo. These materials may be prepared by techniques well known to those skilled in the art. Also preferred are aromatic carbonate copolymers in which from 25 to 75 weight percent of the repeating units comprise chloro- or bromo substituted dihydric phenol, glycol or dicarboxylic acid units, e.g., A. D. Wambach, U.S. Pat. No. 3,915,926. A particulary preferred flame retardant herein is an aromatic copolycarbonate of 50:50 mole ratio of bisphenol-A and tetrabromobisphenol-A prepared like Procedure A of U.S. Pat. No. 3,915,926.

Moreover, the flame retardants used herein, such as the aromatic polycarbonate flame retardants, are used with a synergist, particularly inorganic or organic antimony compounds. Such compounds are widely available or can be made in known ways. In preferred embodiments, the type of antimony compound used is not critical, being a choice primarily based on economics. For example, as inorganic compounds there can be used antimony oxide ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids and the like. Illustrative of the organic antimony compounds, including inorganic salts of such compounds, are: KSb tartrate; Sb caproate; $Sb(OCH_2CH_3)_3$; $Sb(OCH(CH_3)CH_2CH_3)_3$; Sb polymethylene glycolate; triphenyl antimony; and the like; especially preferred is antimony oxide.

The resin component in the molding compositions of the present invention may include in addition to the poly(1,4-butylene terephthalate) resin up to 80 weight parts of other thermoplastic resins per 20 weight parts of poly(1,4-butylene terephthalate) resin. Other suitable thermoplastic resins which may be used include acrylic and methacrylic polymers or copolymers; poly(ethylene terephthalate); epoxy resins; polycarbonates; polyetherimide; phenylene oxide based resins such as polyphenylene oxide and blends of polyphenylene oxide and styrene resins; polyaryl ethers; polyesters; polyethylene; polyphenylene sulfides; polypropylene; polysulfones; ethylene polymers such as ethyl vinyl acetates; and ordered aromatic copolymers, etc.

Furthermore, the composition of the present invention may further comprise an effective amount of any of the known impact modifiers useful for polyesters and polyester blends. These may be added to the compositions by themselves or in combination with the aforementioned aromatic polycarbonates.

The preferred impact modifiers generally comprise an acrylic or methacrylic grafted polymer of a conjugated diene or an acrylate elastomer, alone or copolymerized with a vinyl aromatic compound. Especially preferred grafted polymers are the core-shell polymers of the type available from Rohm & Haas, for example Acryloid KM653, Acryloid KM330 and Acryloid KM611. In general these impact modifiers contain units derived from butadiene or isoprene, alone or in combination with a vinyl aromatic compound, or n-butyl acrylate, alone or in combination with a vinyl aromatic compound. The aforementioned impact modifiers are believed to be disclosed in Fromuth, et al., U.S. Pat. No. 4,180,494; Owens, U.S. Pat. No. 3,808,180; Farnham, et al., U.S. Pat. No. 4,096,202; and Cohen, et al., U.S. Pat. No. 4,260,693, all incorporated herein by reference. Most preferably, the impact modifier will comprise a two stage polymer having either a butadiene or n-butyl acrylate based rubbery core and a second stage polymerized from methylmethacrylate alone or in combination with styrene. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate.

Additional preferred impact modifiers are of the type disclosed in U.S. Pat. No. 4,292,233, incorporated by reference. These impact modifiers comprise, generally, a relatively high content of a cross-linked butadienepolymer grafted base having grafted thereon acrylonitrile and styrene.

Other suitable impact modifiers include, but are not limited to ethylene vinyl acetate, ethylene ethylacrylate copolymers, etc.

The method of blending the compositions of this invention is not critical and can be carried out by conventional techniques. One convenient method comprises blending the polyester and other ingredients in powder or granular form, extruding the blend and comminuting into pellets or other suitable shapes.

The ingredients are combined in any usual manner, e.g., by dry mixing or by mixing in the melted state in an extruder, on a heated mill or in other mixers.

By way of illustration, chopped glass (glass rovings which have been chopped into small pieces, e.g. ⅛ to 1 inch in length, and preferably less than ¼ inch in length) is put into an extrusion compounder with the polyester resin, other ingredients, and optionally, other additive(s) to produce molding pellets. The fibers are shortened and predispersed in the process, coming out at less than 1/16 inch long. In another procedure, glass filaments are ground or milled to short lengths, and are mixed with the polyester resin and stabilizers, and, optionally other additive(s), by dry blending then either fluxed or a mill and ground, or they are extruded and chopped. The glass fibers can also be mixed with resin and additives and directly molded, e.g. by injection or transfer molding techniques.

It is always important to thoroughly free all of the ingredients, the polyester resin and other ingredients from as much water as possible.

Although it is not essential, best results are obtained if the ingredients are precompounded, pelletized and then molded. Precompounding can be carried out in conventional equipment. For example, after carefully predrying the polyester resin, other ingredients, and, optionally, other additives and/or reinforcements, a single screw extruder is fed with a dry blend of the composition, the screw employed having a long transition section to insure proper melting. On the other hand, a twin screw extrusion machine, can be fed with resins and additives at the feed port and reinforcement down stream. In either case, a generally suitable machine temperature will be about 450° to 575° F.

The precompounded composition can be extruded and cut or chopped into molding compounds, such as conventional granules, pellets, etc. by standard techniques.

The compositions can be molded in any equipment conventionally used for thermoplastic compositions. For example, good results will be obtained in an injection molding machine, e.g. of the Newbury type, with conventional cylinder temperatures, e.g., 500° F. and conventional mold temperatures e.g., 150° F. If necessary, depending on the molding properties of the polyester, the amount of additives and/or reinforcing filler and the rate of crystallization of the polyester component, those skilled in the art will be able to make the conventional adjustments in molding cycles to accommodate the composition.

The compositions of this invention may be used alone as molding pellets or mixed with other polymers and may contain additional, non-reinforcing fillers, such as wood flour, cloth fibers, and the like, as well as pigments, dyes, stabilizers, plasticizers, and the like. One skilled in the art may readily determine which are necessary and suitable for a particular application.

DESCRIPTION OF THE PREFERRED EMBODIMENTS

The following examples illustrate the preparation of certain compositions within the scope of this invention. They are not to be construed to limit the invention in any manner whatsoever. All parts, except as otherwise indicated, are by weight.

| Tests | |
|---|---|
| Notched and Unnotched Izod | ASTM D256 |
| Flexural Strength | ASTM D790 |
| Flexural Modulus | ASTM D790 |
| Tensile Strength | ASTM D638 (Type V Bar) |
| Arc Track Rate | UL 746A |

EXAMPLES 1-8

The formulations shown below were preblended and extruded on a 1¾" Sterling Extruder having a barrel profile of 540°-560°-580° F. and a die head at 520° F. The extrudate was cooled through a water bath prior to pelletizing. Test parts were injection molded on a 3 oz. Van Dorn molding press with a set temperature of approximately 480° F. The resin was dried for four hours at 250° F. in a forced air circulating oven prior to injection molding.

| | 1* | 2 | 3 | 4 | 5 | 6 | 7 | 8 |
|---|---|---|---|---|---|---|---|---|
| PBT[1] | 69.8 | 69.5 | 69.5 | 69.5 | 69.5 | 69.5 | 69.5 | 69.5 |
| Glass | 30 | 30 | 30 | 30 | 30 | 30 | 30 | 30 |
| Stabilizer[2] | 0.15 | 0.15 | 0.15 | 0.15 | 0.15 | 0.15 | 0.15 | 0.15 |
| Stabilizer[3] | 0.05 | 0.05 | 0.05 | 0.05 | 0.05 | 0.05 | 0.05 | 0.05 |
| cuprous iodide | — | 0.3 | — | — | — | — | — | — |
| iron sulfate | — | — | 0.3 | — | — | — | — | — |
| magnesium sulfate | — | — | — | 0.3 | — | — | — | — |
| aluminum benzoate | — | — | — | — | 0.3 | — | — | — |
| zinc oxide | — | — | — | — | — | 0.3 | — | — |
| zinc carbonate | — | — | — | — | — | — | 0.3 | — |
| copper sulfide | — | — | — | — | — | — | — | 0.3 |
| Arc Track Rate, in/min | 0.88 | 0 | 0.88 | 0.84 | 1.00 | 0.84 | 0.75 | 0 |

-continued

| | 1* | 2 | 3 | 4 | 5 | 6 | 7 | 8 |
|---|---|---|---|---|---|---|---|---|
| (UL 746A) | | | | | | | | |

[1] poly(1,4-butylene terephthalate) resin, VALOX ® resin grade 300, M.V. = 2200-3800 poise, General Electric Company
[2] hindered phenol antioxidant
[3] phosphorous based stabilizer
*control

EXAMPLES 9–16

The method of Examples 1–8 was used to produce test pieces of the formulations shown below.

| | 9* | 10 | 11 | 12 | 13 | 14 | 15 | 16 |
|---|---|---|---|---|---|---|---|---|
| PBT[1] | 47.65 | 47.35 | 47.35 | 47.35 | 47.35 | 47.35 | 47.35 | 32.65 |
| Glass | 30 | 30 | 30 | 30 | 30 | 30 | 30 | 30 |
| Stabilizer[2] | 0.15 | 0.15 | 0.15 | 0.15 | 0.15 | 0.15 | 0.15 | 0.15 |
| Flame Retardant[4] | 15 | 15 | 15 | 15 | 15 | 15 | 15 | 15 |
| $Sb_2O_3$ Concentrate[5] | 7.1 | 7.1 | 7.1 | 7.1 | 7.1 | 7.1 | 7.1 | 7.1 |
| Teflon 6[6] | 0.1 | 0.1 | 0.1 | 0.1 | 0.1 | 0.1 | 0.1 | 0.1 |
| Zinc Carbonate | — | 0.3 | — | — | — | — | — | — |
| Cupric Chloride | — | — | 0.3 | — | — | — | — | — |
| Cuprous Chloride | — | — | — | 0.3 | — | — | — | — |
| Cuprous Iodide | — | — | — | — | 0.3 | — | — | — |
| Potassium Iodide | — | — | — | — | — | 0.3 | — | — |
| Copper Sulfide | — | — | — | — | — | — | 0.3 | 10.0 |
| Arc Track Rate, in/min (UL 746A) | 14.2 | 0.02 | 0 | 0 | 0 | 4.8 | 0.02 | 4.8 |

[1] poly(1,4-butylene terephthalate) resin, VALOX ® resin grade 300, M.V. = 2200-3800 poise, (melt viscosity at 250° C.) General Electric Company
[2] hindered phenol antioxidant
[4] Tetrabromobisphenol - phosgene oligomer
[5] 80/20 by weight $Sb_2O_3$/polyethylene concentrate
[6] drip suppressant
*control

What is claimed is:

1. A thermoplastic molding composition from which parts may be molded exhibiting improved Arc Track Rate comprising
    (a) poly(1,4-butylene terephthalate) resin; and
    (b) an amount of at least one effective metal salt selected from the group consisting of the oxides, fluorides, chlorides, bromides, iodides, chlorates, nitrates, nitrites, borates, phosphates, phosphites, sulfates and sulfites of magnesium, aluminum, iron and potassium sufficient to reduce Arc Track Rate, said amount being from about 0.05 to about 1 part by weight of said metal salt for each 50 parts by weight of said poly(1,4-butylene terephthalate) resin.

2. The composition of claim 1 wherein said effective metal salt is a potassium salt.

3. The composition of claim 2 wherein said potassium salt is potassium iodide.

4. The composition of claim 1 which additionally contains a reinforcing amount of glass fiber reinforcement.

5. A thermoplastic molding composition from which parts may be molded exhibiting improved Arc Track Rate comprising:
    (a) poly(1,4-butylene terephthalate) resin;
    (b) a flame retarding halogenated aromatic flame retardant;
    (c) an effective amount of antimony compound synergist; and
    (d) an amount of at least one effective metal salt selected from the group consisting of the oxides, fluorides, chlorides, bromides, iodides, chlorates, nitrates, nitrites, borates, phosphates, phosphites, sulfates and sulfites of magnesium, aluminum, iron and potassium sufficient to reduce Arc Track Rate, said amount being from about 0.05 to about 1 part by weight of said metal salt for each 50 parts by weight of said resin and halogenated aromatic flame retardant.

6. The composition of claim 5 wherein said effective metal salt is a potassium salt.

7. The composition of claim 6 wherein said potassium salt is potassium iodide.

8. The composition of claim 5 which additionally contains a reinforcing amount of glass fiber reinforcement.

9. A thermoplastic molding composition from which parts may be molded exhibiting improved Arc Track Rate comprising:
    (a) poly(1,4-butylene terephthalate) resin; and
    (b) an Arc Track Rate reducing amount of an effective metal salt selected from the group consisting of an oxide, fluoride, chloride, bromide, iodide and of a metal selected from the group consisting of and potassium, said amount being from about 0.05 to about 1 part by weight of said metal salt for each 50 parts by weight of said poly(1,4-butylene terephthalate) resin.

* * * * *